United States Patent
Singh et al.

(10) Patent No.: US 8,929,852 B1
(45) Date of Patent: Jan. 6, 2015

(54) METHOD AND SYSTEM FOR MANAGING A WIRELESS COMMUNICATION DEVICE TO APPLY A REVISED SCANNING ORDER IN RESPONSE TO EXTERNAL EVENTS

(71) Applicant: Sprint Spectrum L.P., Overland Park, KS (US)

(72) Inventors: Jasinder P. Singh, Olathe, KS (US); Siddharth S. Oroskar, Overland Park, KS (US); Maulik K. Shah, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 101 days.

(21) Appl. No.: 13/746,906

(22) Filed: Jan. 22, 2013

(51) Int. Cl.
  *H04M 11/04* (2006.01)
  *H04M 1/00* (2006.01)
  *H04W 48/18* (2009.01)

(52) U.S. Cl.
  CPC ................................ *H04W 48/18* (2013.01)
  USPC ................................ 455/404.1; 455/552.1

(58) Field of Classification Search
  USPC ............ 455/452.1, 453, 404.1; 370/328, 329, 370/235
  See application file for complete search history.

(56) References Cited

U.S. PATENT DOCUMENTS

| | | | |
|---|---|---|---|
| 6,516,188 B1 * | 2/2003 | New et al. | 455/404.1 |
| 6,625,119 B1 * | 9/2003 | Schuster et al. | 370/230 |
| 2007/0142046 A1 * | 6/2007 | Welnick | 455/434 |
| 2008/0220772 A1 * | 9/2008 | Islam et al. | 455/432.2 |
| 2009/0264094 A1 * | 10/2009 | Smith | 455/404.2 |
| 2009/0312031 A1 * | 12/2009 | Harris et al. | 455/453 |
| 2010/0062760 A1 | 3/2010 | Fuccellaro et al. | |

* cited by examiner

*Primary Examiner* — Daniel Lai (57) ABSTRACT

Methods and system for managing, during an external event, a wireless communication device configured to search for an available wireless communication system from among a plurality of wireless communication systems in accordance with a first priority order. Upon detecting that an external event has occurred, a communication network may determine, based in part on the external event, a period of time that is associated with the external event, and cause the wireless communication device to search, for the determined period of time, for an available wireless communication system from among the plurality of wireless communication systems in accordance with a second priority order instead of the first priority order. Upon expiration of the determined period of time, the communication network may cause the wireless communication device to search for the available wireless communication system in accordance with the first priority order instead of the second priority order.

14 Claims, 5 Drawing Sheets

METHOD AND SYSTEM FOR MANAGING A WIRELESS COMMUNICATION DEVICE TO APPLY A REVISED SCANNING ORDER IN RESPONSE TO EXTERNAL EVENTS

BACKGROUND

Unless otherwise indicated herein, the materials described in this section are not prior art to the claims and are not admitted to be prior art by inclusion in this section.

The use of wireless communication devices (WCDs) is becoming increasingly prevalent and popular in modern life, and more people than ever are using mobile WCDs to connect to wireless communication systems. To provide wireless communication service to WCDs (also often referred to as smart phones, client devices, user equipment, mobile stations, subscriber devices, access terminals, and the like), a wireless service provider typically operates and manages one or more wireless communication systems. In a typical wireless communication system, a radio access network (RAN) includes one or more base stations that radiate to define one or more wireless coverage areas such as cells and cell sectors in which suitably equipped WCDs can operate.

In practice, the RAN and its served WCDs may be arranged to communicate with each other according to an agreed air interface protocol that defines a mechanism for use of communication resources to support wireless exchange of voice, data, multimedia, and/or other content. Examples of such protocols include CDMA (e.g., 1xRTT or 1xEV-DO), LTE, WiMAX, IDEN, GSM, WIFI, HSDPA, among others now known or later developed. The air interface in each coverage area is typically divided into a plurality of channels for carrying communications between the WCDs and the wireless communication system. For example, the air interface may define a forward-link (or "downlink") for carrying communications from the RAN to the WCDs and a reverse-link (or "uplink") for carrying communications from the WCDs to the RAN. In various implementations, these links may be defined on one or more carrier frequencies or blocks of frequencies. Furthermore, on each link, various channels may be defined through techniques such as time division multiplexing, code division multiplexing, frequency division multiplexing, and the like.

By way of example, the forward-link may define a pilot channel for carrying a pilot signal usable by WCDs to detect and evaluate coverage, a paging channel for carrying page messages to particular WCDs, other overhead channels for carrying system parameter information and the like, and a number of traffic channels for carrying bearer traffic (e.g., call traffic) to WCDs. The reverse-link, on the other hand, may define an access channel for carrying messages from WCDs to facilitate registration, responding to pages, originating calls and the like, and a number of traffic channels for carrying bearer traffic from WCDs to the RAN. Depending on the protocol, the channel definitions may differ and other names for the channels may be used.

In practice, the reverse link access channel may define a number of containers, such as timeslots or resource elements, for carrying access channel messages from WCDs to the RAN. WCDs may then be arranged to transmit access channel messages called "access probes" in these containers. For instance, when a WCD first enters into wireless coverage and at other times, the WCD may transmit a radio access registration message in an access probe to the RAN, to notify the RAN where the WCD is located. Further, when the WCD seeks to originate a call (e.g., a voice call and/or data session), the WCD may transmit an origination message in an access probe to the RAN to trigger setup of the call. Further still, when a WCD receives a page message from the RAN on the forward link paging channel, the WCD may transmit a page response message in an access probe to the RAN. Moreover, the WCD may be arranged to transmit certain user data such as short message service (SMS) messages as data bursts in access probes to the RAN, to avoid the need to set up an air interface traffic channel for such communication.

To help determine which wireless communication systems a given WCD may operate in, WCDs typically store a "preferred roaming list" (PRL), which includes a prioritized listing of wireless communications systems that the WCD may access. In practice, each available wireless communication system may emit a pilot signal (or the like), via the pilot channel, that uniquely identifies the wireless communication system. For each wireless communication system listed in the PRL, the PRL may then specify corresponding access data, such as radio-wave frequency and system/network identification code. Using the specified data, the WCD may then search for a wireless communication system (i.e., scan the airwaves in search of a system) in the order the wireless communication systems are listed in its PRL and may then register with the highest priority system it finds.

As a general matter, a PRL can take any of a variety of forms. By way of example, a rudimentary PRL may take the form of a simple flat file listing or data table in which each entry corresponds with a respective system and indicates a radio frequency and system/network identifier for the system. Using such a PRL, a WCD may repeatedly sequence through the listed entries, for each entry scanning the indicated frequency in search of a pilot carrying the indicated identifier, and the WCD may register with the first (i.e., highest priority) system that it finds.

More typically, however, a PRL will include a separate "acquisition table" and "system table." The acquisition table may list frequencies to be scanned for allowed systems, and the system table may then provide a priority-ordered listing of allowed systems, specifying for each system an associated system identifier and/or network identifier. Under CDMA, for instance, each system table entry usually specifies a respective "system identification code" (SID) and "network identification code" (NID), and each CDMA base station broadcasts its SID and NID in system overhead messages. Thus, when a WCD detects an allowed SID-and-NID combination, the mobile station may connect to the identified system.

OVERVIEW

In some situations, a wireless communication system that is serving a given WCD may experience heavy loading. For example, the reverse link air interface can become overwhelmed if too many WCDs being served by the wireless communication system seek to send access probes at once. In particular, if access probes from two or more WCDs line up (by chance) in the same access channel container, such as the same timeslot, an "access probe collision" may occur. The result of such a collision may be that the RAN will not receive any of the access probes in that container in a comprehensible form, due to interference between the access probes. Consequently, each WCD may have to re-transmit its access probe.

In addition to the wireless communication system becoming overwhelmed when too many WCDs seek to send access probes at once, the wireless communication system may also experience heavy loading as a result of various other channels being overloaded or due to scarce traffic channel resources in situations where many people place calls at once within a given coverage area. For example, each time an access probe is sent on behalf of a given WCD (e.g., due to the WCD desiring to make a call), the RAN sends an access probe acknowledgement message using a paging channel. Consequently, when the RAN has numerous acknowledgement messages to send the paging channel can become congested, which may delay call setup or even result in a page not reaching the intended WCD.

In yet further examples, though the RAN may be receiving continuous access probes from a given WCD (e.g., to initiate a call), the RAN may not have available traffic channels to assign/reserve for the given WCD's communication. Regardless of the reasons for the heavy loads on the wireless communication system, ultimately, heavy loads may result in delayed call setup and blocked calls, which may translate into unacceptable user experience.

Particularly in situations where many users are placing calls at once, a given wireless communication system may experience heavy loading for some or all of the reasons set forth above. For example, after a football game or in an emergency situation, many people within a given coverage area may use their mobile phones to place calls (e.g., to call 911, to call friends and family, to check voice mail, or for other purposes). Each time a WCD attempts to place a call, as noted above, the WCD may send at least one access probe. Consequently, in a situation where many people within a given coverage area place calls at once, many access probes may be sent at essentially the same time. As a result, many access probe collisions may occur, and so still more access probes transmissions (re-transmissions) may occur. Further, at the same time, WCDs may be periodically registering with the system and responding to page messages and the like, which may additionally increase the number of access probe collisions and thus further overwhelm the access channel.

Considering this, the present disclosure is directed to a method and system for managing a WCD, particularly in a scenario where an external event has occurred that is likely to result in high loading of the wireless communication system the WCD is operating in, or likely to operate in the near future. In particular, disclosed in one respect is a method in a communication network for managing a WCD that may be configured to search for an available wireless communication system from among a plurality of wireless communication systems in accordance with a first priority order. The first priority order may, for example, define a list of preferred wireless communication systems. The method may involve a processing unit detecting at least one external event. The external event may be an event that does not involve operation of the communication network and does not involve operation of the WCD, but that is likely to result in significant loading of the wireless communication system. Examples of such events may include a severe weather event, a sporting event, a theatrical event, a chemical or nuclear disaster, a natural disaster, and a crowd-gathering event such as the end of a sporting event, concert, or demonstration, where many users may be likely to place calls at about the same time.

In response to detecting that the at least one external event occurred, the method may then involve determining, based at least in part on the detected external event, a period of time that is associated with the external event. The period of time may be an indication of how long the external event is likely to occur, and determining the period of time may include, for example, predicting the period of time based on a schedule associated with the external event.

In response to detecting that the at least one external event occurred, the method may also involve causing the WCD to search, for the determined period of time, for an available wireless communication system from among the plurality of wireless communication systems in accordance with a second priority order instead of the first priority order. The second priority order may be different than the first priority order, and may, for example, include wireless communication devices that are not as heavily loaded as the wireless communication system included in the first priority order.

The method may additionally involve, upon expiration of the determined period of time, causing the WCD to search for the available wireless communication system from among the plurality of wireless communication systems in accordance with the first priority order instead of the second priority order. Consequently, the method may help to ensure the WCD maintains a certain quality of service by utilizing other, non-heavily loaded wireless communication systems, for the period of time that the external event is occurring. Once the determined period of time has expired (e.g., the external event has ended), the WCD may, for example, seek to be served by its original wireless communication system.

In another respect, disclosed is a method in a communication network for managing a WCD. The WCD may include data storage that contains a first PRL that defines a first priority order, and the WCD may be configured to search for an available wireless communication system from among a plurality of wireless communication systems in accordance with the first PRL. The method may involve a processing unit detecting at least one external event. The external event may be an event that does not involve operation of the communication network and does not involve operation of the WCD.

In response to detecting the at least one external event, the method may involve determining, based at least in part on the external event, a period of time that is associated with the external event. The method may also involve wirelessly transmitting from at least one base station a control signal that causes the WCD to search, for the determined period of time, for an available wireless communication system from among the plurality of wireless communication systems in accordance with a second priority order instead of the first priority order. The second priority order may be different than the first priority order. Additionally, the method may involve causing the WCD to search, upon expiration of the period of time, for the available wireless communication system from among the plurality of wireless communication systems in accordance with the first priority order instead of the second priority order.

Still further, disclosed is a communication network that includes at least one WCD and a processing unit. The at least one WCD may be configured to search for an available wireless communication system from among a plurality of wireless communication systems in accordance with a first priority order. In the communication network, the processing unit may be configured to detect at least one external event that does not involve operation of the communication network and does not involve operation of the WCD.

The processing unit may additionally be configured to respond to detecting the at least one external event by determining, based at least in part on the external event, a period of time that is associated with the external event. The processing unit may also be configured to wirelessly broadcast a control signal that causes the at least one WCD to search, for the determined period of time, for an available wireless communication system from among the plurality of wireless communication systems in accordance with a second priority order instead of the first priority order, and the second priority order may be different than the first priority order.

Even further, the processing unit may be configured to detect the at least one external event, and may involve causing the WCD to search, upon expiration of the determined period of time, for the available wireless communication system from among the plurality of wireless communication systems in accordance with the first priority order instead of the second priority order.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

BRIEF DESCRIPTION OF THE DRAWINGS

Various example embodiments are described herein with reference to the following drawings, in which like numerals denote like entities, and in which.

DETAILED DESCRIPTION

The present methods and systems will now be described with reference to the drawings. It should be understood, however, that this and other arrangements described herein are set forth as examples only. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1:
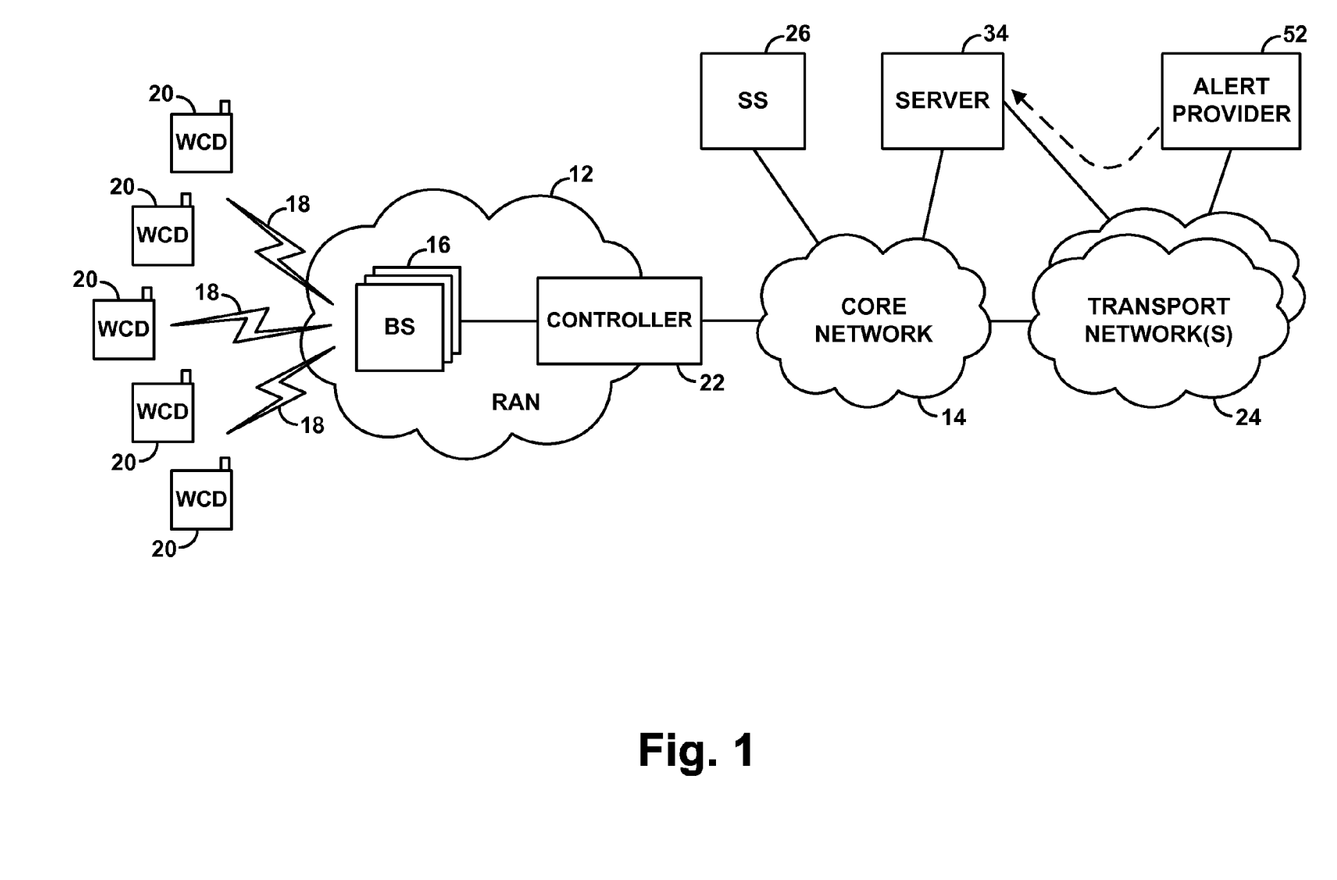
FIG. 1 is a simplified block diagram illustrating a communication network in connection with which the present methods can be implemented.

Referring to the drawings, FIG. 1 is a simplified block diagram depicting a communication network in connection with which the present methods can be implemented. FIG. 1 depicts the example communication network as including a RAN 12 and core network 14, both of which may be operated by a wireless carrier. RAN 12 is shown including one or more base stations 16 (e.g., base transceiver stations, access nodes, node-Bs, eNodeBs, or the like), each having one or more antennas and associated equipment to facilitate communication over a respective air interface 18 with one or more WCDs 20 that may subscribe to service by the wireless carrier and are arranged to be served by the RAN. The RAN is shown including or being coupled with a controller 22, such as a base station controller, mobile switching center, media gateway, radio network controller, mobility management entity, or the like, which, depending on implementation, may control aspects of base station and air interface operation and/or may provide connectivity with the core network 14. Within the context of this disclosure, RAN 12, one or more BS 16, and air interface 18 may be components included in a wireless communication system of a particular type that the communication network may operate. The communication network may operate several wireless communication systems of varying types. Each wireless communication type may include, for example, a type of air interface protocol and a band class that allows the wireless communication system to communicate with a subscribing WCD. For example the communication network may operate both a LTE wireless communication system and a 1xEV-DO wireless communication system.

Core network 14 provides connectivity with one or more transport networks 24, such as the public switched telephone network (PSTN) and the Internet.

Shown sitting as a node on core network 14 is a subscriber server (SS) 26, such as a home location register or a home subscriber server, which functions to store subscription-related information related to each WCD being served by the RAN. For example, SS 26 may maintain a home profile record of each WCD that subscribes to service with the wireless carrier in a particular region that may include specific subscriber information as well as an indication of where in the RAN the WCD is currently operating—such as which base station, switch, or other node that is currently serving the WCD—to facilitate setup of communications to the WCD. In practice, when a WCD powers on or moves into a new coverage area (e.g., a new paging zone or tracking area), the WCD may scan for and detect a pilot signal broadcast by a base station of the RAN and may then transmit a registration message in an access probe to that base station, which may trigger signaling to the SS to update the current location of the WCD.

Also shown sitting as a node on the core network 14 is a server 34, which may function to detect when an external event has occurred, and to responsively determine a period of time associated with the external event, and cause at least one WCD being served by the communication network to search for an available wireless communication system in accordance with a defined priority order for the determined period of time. Upon expiration of the period of time (e.g., when the external event ends), server 34 may also function to cause the WCD to search for the available wireless communication system in accordance with a different defined priority order.

Figure 2:
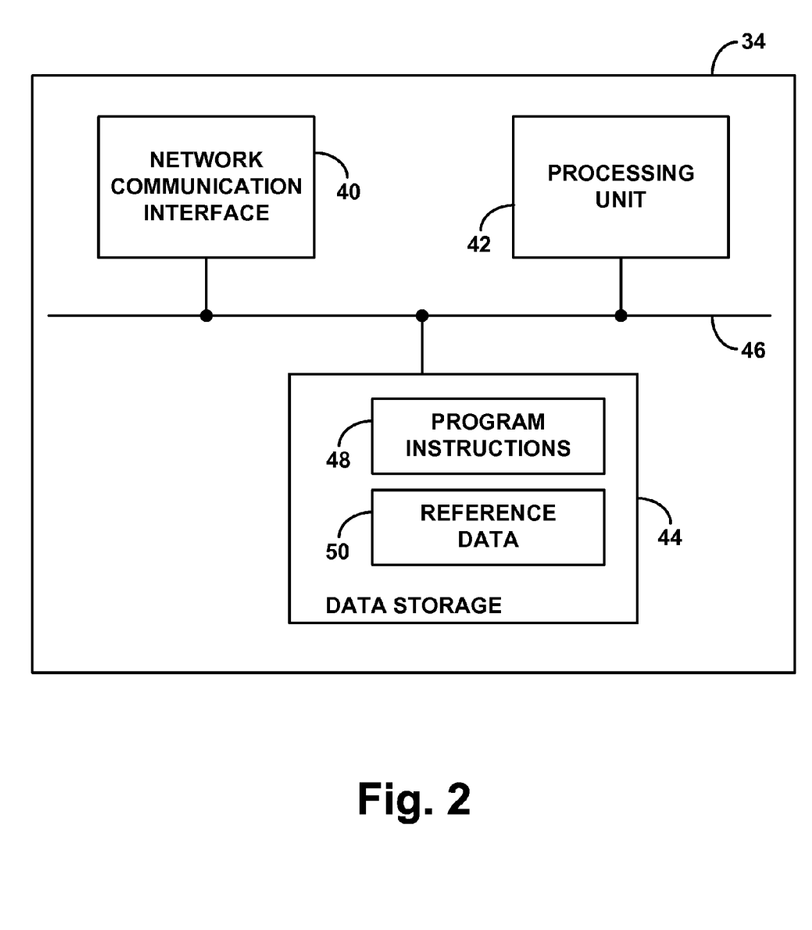
FIG. 2 is a simplified block diagram of a server operable in the methods.

In further examples, the server 34 may also function to determine which one or more base stations serve the area likely to be impacted by the external event, and to arrange for the determined base station(s) to transmit a control signal that causes the at least one WCD being served by the determined base station(s) to perform the actions explained above. FIG. 2 is a simplified block diagram of such server 34, showing some of the components that the server may contain by way of example.

As shown in FIG. 2, the representative server 34 may include a network communication interface 40, a processing unit 42, and non-transitory data storage 44, all of which may be coupled together by a system bus, network, or other connection mechanism 46.

With this arrangement, network communication interface 40 functions to connect server 34 with core network 14 and allow the server to engage in communication via the core network with various other entities, such as with various alert providers situated on transport network(s) 24 to receive indications of alerts, and controller 22 to facilitate causing base stations to transmit a control signal to cause at least one WCD to search for available wireless communication systems based on a certain priority order and for a certain period of time. Processing unit 42 may comprise one or more general purpose processors (e.g., microprocessors) and/or one or more special purpose processors (e.g., application specific integrated circuits). Data storage 44 may comprise one or more volatile and/or non-volatile storage components, such as magnetic, optical, or flash storage, and may be integrated in whole or in part with processing unit 42.

As shown, data storage 44 may contain program instructions 48 and reference data 50. Program instructions 48 may be executable by processing unit 42 to carry out various functions described herein. Reference data 50 may comprise various data usable by the processing unit to carry out the functions described. For instance, the reference data 50 may include mapping data that indicates where particular base stations and base station coverage areas are located so as to enable the processing unit 42 to decide which base stations should transmit the control signal in accordance with the present methods upon determining that an external event likely to affect a particular area has occurred. In other examples, the reference data 50 may also include scheduling data and/or timing information relating to various external events so as to enable the processing unit 42 to predict a period of time associated with the external event. Reference data 50 may include other information that relates to the external event as well.

Note that in an alternative arrangement, the processing unit 42 and/or functions of the processing unit 42 could be provided elsewhere in the system of FIG. 1, or could be distributed among various entities in the system. By way of example, the processing unit 42 and corresponding functions could be provided at SS 26, at controller 22, in one or more of the base stations, or elsewhere.

Referring back to FIG. 1, shown sitting as a node on transport network(s) 24 (e.g., on the Internet) is an example alert provider 52, such as a server or other system that is arranged to generate and/or provide alerts regarding external events and periods of time associated with the external events. Depending on the type of external event, the alert provider may take various forms and/or operate in various ways. By way of example, for weather emergencies, the alert provider may be a server operated by the National Weather Service, which may broadcast or otherwise provide alert messages regarding the occurrence of severe weather situations, specifying in each such message affected location area(s) and a likely duration of the severe weather event. As another example, for terrorist attacks or other criminal activities, the alert provider may be a law enforcement entity, which may broadcast alert messages regarding the occurrence of the criminal activity, similarly specifying affected location area(s) and possibly a prediction of the duration of the criminal activity. Such alerts may be set forth in text format in predefined message fields, so that a recipient entity such as server 34 can automatically parse the alert to determine where the external event is occurring and for what amount of time the external event may be occurring. Other alert formats are possible, and may include any data format capable of being parsed and processed by server 34.

In some implementations, the alert provider 52 may provide an alert about an external event in essentially real time in response to the event having just recently occurred. For instance, if a severe traffic accident occurs, the alert provider may respond to the occurrence of that event by providing the alert. Server 34 may thus receive the alert and promptly take action in accordance with the present method. For example, in response to receiving the alert, server 34 may determine a type of the external event (e.g., an accident), and may predict a period of time that may be spent addressing/clearing the traffic accident.

Alternatively, the alert provider may provide an alert in advance of the external event, specifying in the alert when the event is scheduled to occur. In that case, the server 34 may receive the alert and programmatically schedule itself to take action in accordance with the present method at the indicated time. For example, the alert provider may have information indicating the time of day when a sporting event, concert, or demonstration is scheduled to begin and end, and may provide that timing information, along with a specification of the location external event, in an alert to server 34. Server 34 may then responsively program itself to take action in accordance with the present methods.

Figure 3:
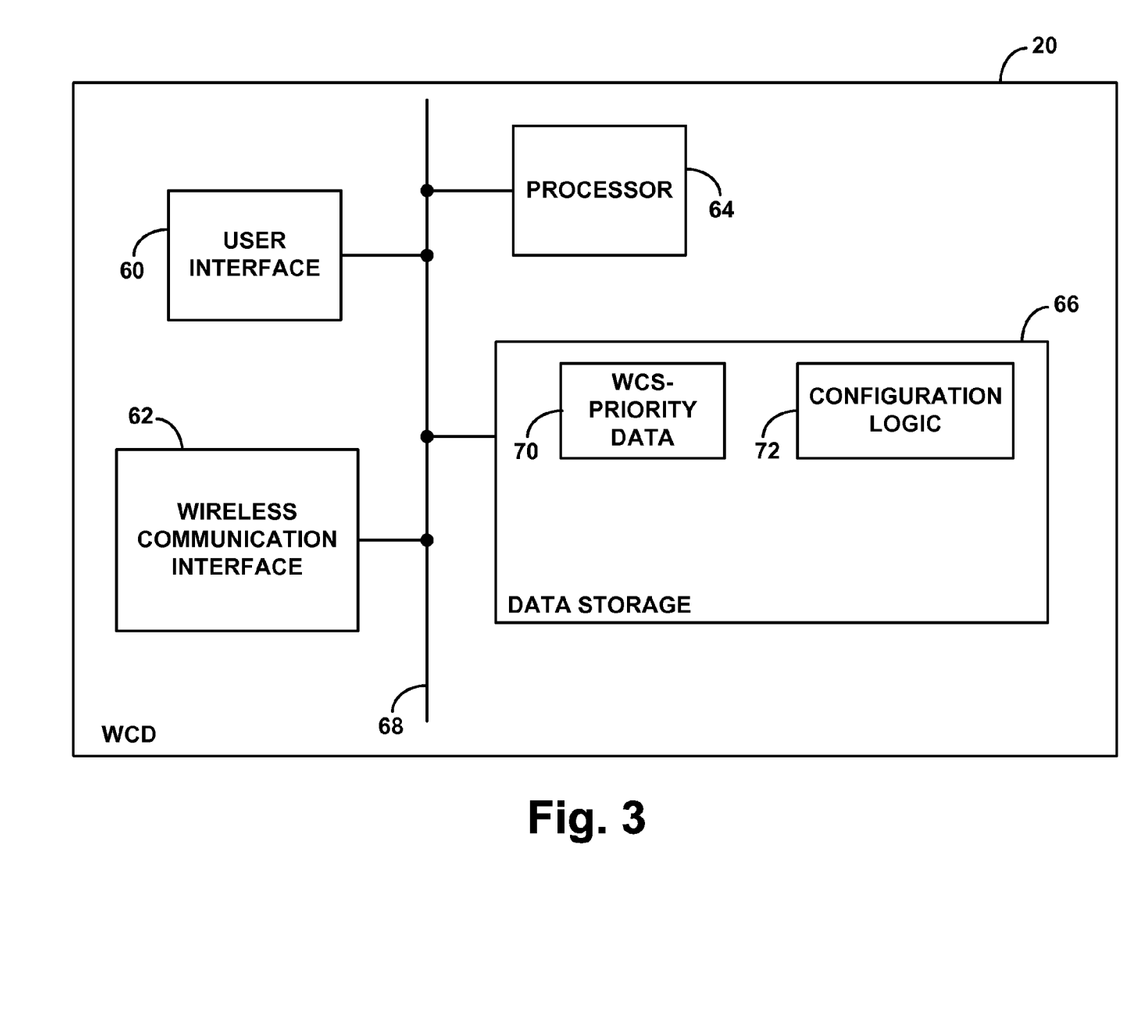
FIG. 3 is a simplified block diagram of a WCD operable in the methods.

Referring next to FIG. 3, a block diagram of an example WCD is shown, to help illustrate how such a device might operate in an example implementation of the method. As shown in FIG. 3, WCD 20 includes a user interface 60, a wireless communication interface 62, a processor 64, and non-transitory data storage 66, all of which may be coupled together by a system bus, network, or other communication mechanism 68. These components may be housed within a unitary housing forming an outer shell of WCD 20. In alternative embodiments, however, some or all of the components may be integrated together in some other manner.

In this arrangement, user interface 60 may function to facilitate user interaction with the WCD if appropriate. As such, the user interface may comprise input components such as a keypad, microphone, and touch-sensitive screen or pad, and output components such as a display screen and loudspeaker. User interface 60 may further include analog/digital conversion circuitry (not shown) and/or other components that facilitate exchange of information and media between a user and user interface 60 or other components.

Wireless communication interface 62 may function to enable WCD 20 to communicate with an available wireless communication system. To do so wireless communication interface 62 may function to enable WCD 20 to communicate over air interface 18 with one or more base stations 16, in accordance with an agreed air interface protocol such as one of those noted above for instance. As such, the wireless communication interface 62 may comprise one or more antennas as well as a chipset arranged to communicate according to one or more particular air interface protocols.

Wireless communication interface 62 may also function to receive and resolve pilot signals or the like emitted by various available wireless communication systems. As such, for instance, wireless communication interface 62 may be equipped to tune to a designated carrier frequency and to scan airwaves in an effort to receive and resolve pilot signals. For instance, to operate in a 1xEV-DO wireless communication system, the wireless communication interface 68 may include one or more radio tuners and rake receivers that cooperatively receive and resolve spread spectrum signals defining pilot signals from various base stations. Other examples are possible as well.

Processor 64 may comprise one or more general purpose processors and/or one or more special purpose processors (e.g., digital signal processors) and may be integrated in whole or in part with wireless communication interface 62. Data storage 66 may comprise one or more volatile and/or non-volatile storage components, such as magnetic, optical, or flash storage, and may be integrated in whole or in part with processor 64, such as in the form of cache memory for instance.

As shown in FIG. 3, data storage 66 may contain a set of wireless communication system priority data (WCS Priority Data) 70. This data may specify a list of preferred wireless communication systems, and may specify, respectively for each wireless communication system a priority level of the wireless communication system, differentiating the wireless communication systems as having different priority levels or levels of preference. These priority levels may be established specifically for purposes of the present methods and/or for other purposes. By way of example, if WCD 20 is in an area with a strong LTE signal, it may be appropriate to assign a high level of priority to a LTE wireless communication system. Alternatively, if, for example during an external event, the LTE wireless communication system is experiencing heavy loading, and a CDMA wireless communication system such as 1xEV-DO is not experiencing heavy loading, it may be appropriate to assign a low level of priority to the LTE wireless communication system and a high level priority to the 1xEV-DO wireless communication system. Similar distinctions could be drawn for other wireless communication systems as well. Further, there could be multiple levels of priority, beyond just high and low for instance. In addition to the WCS Priority Data 90, data storage 66 may include a set of configuration logic 72, including program instructions and associated reference data, that processor 64 uses to carry out various functions described herein.

In one embodiment (not shown), the WCS Priority Data takes the form of a preferred roaming list (PRL), which specifies the set of wireless communication systems and defines the priority order in which WCD 20 should search for an available wireless communication system from among those specified.

In accordance with the methods described herein, WCD 20 may be arranged to carry out various WCD functions described herein in various ways. For instance, the WCD may carry out some of these functions through operation of the processor 64 executing program instructions. For instance, when the wireless communication interface 62 receives a control signal from a serving base station in accordance with a method described herein, the wireless communication interface 62 may signal to the processor 64, and the processor may take action to cause the WCD 20 to search for an available wireless communication system based on a certain priority. Alternatively or additionally, the WCD may carry out these functions through operation of the wireless communication interface 62. For instance, when the wireless communication interface 62 receive a control signal from a serving base station in accordance with a method herein, the wireless communication interface may itself take action to cause the WCD to search for an available wireless communication system based on a certain priority.

Figure 4:
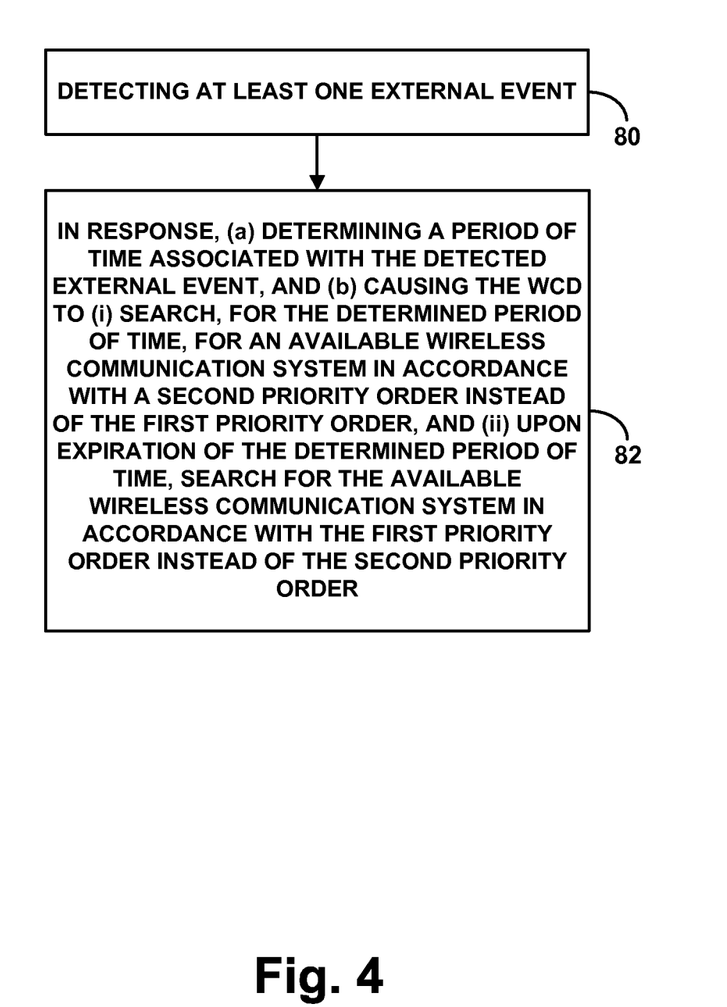
FIG. 4 is a flow chart depicting functions that can be carried out in accordance with the methods.

FIG. 4 is a flow chart illustrating functions that can be carried out in accordance with the present methods, to manage a given WCD in a communication network during the occurrence of an external event. The WCD may be the same as WCD 20, and may be configured to search for an available wireless communication system from among a plurality of wireless communication systems in accordance with a first priority order. As noted above, the external event may comprise a severe weather event, a sporting event, a theatrical event, a chemical or nuclear disaster, or any other crowd-gathering event, and the first priority order may define a first sequence of preferred wireless communication systems. Accordingly, WCD 20 may be configured to sequentially search for each of the wireless communication system in order of the first sequence until the WCD finds an available wireless communication system.

In practice, the first priority order may be defined the by a first PRL, and the WCD may be configured to search for the available wireless communication system in accordance with the first PRL.

As shown in FIG. 4, at block 80, the method may involve detecting at a processing unit that an external event has occurred. As noted above, for instance, processing unit 42 of server 34 may detect that the external event has occurred by receiving from alert provider 54 an alert generated and provided in response to the occurrence of the event. Alternatively, processing unit 42 could receive an indication of when the event is scheduled to occur, and the act of detecting that the event occurred may involve determining when that predetermined time comes, possibly receiving an internally generated alert indicating occurrence of the external event.

Detecting the occurrence of the external event may further involve the communication network determining that there is more than a threshold level of occupancy on an air interface channel that is serving WCD 20 in a particular coverage area. In response to detecting more than a threshold level of occupancy on the air interface channel, the communication network may determine a location of the WCD within the coverage area and, based at least in part on the location of the WCD, query a server to determine whether an external event is occurring at the location. If it is determined that an external event is occurring, the server may specify in a message a period of time of which the external event is likely to occur.

At block 82, in response to detecting that the external event has occurred, the method may then involve (a) based at least in part on the detected external event, determining a period of time that is associated with the detected external event, and (b) causing the wireless communication device to (i) search for an available wireless communication system from among the plurality of wireless communication systems in accordance with a second priority order instead of the first priority order for the determined period of time. Once the period of time has expired, the communication network may cause the WCD 20 to search for the available wireless communication system from among the plurality of wireless communication systems in accordance with the first priority order instead of the second priority order. In other words, the communication network may cause WCD 20 may be caused to search for an available wireless communication system based on its original priority order.

As noted above, the determined period of time may be an indication of how long the external event is likely to occur or a likely duration of the external event. To determine the period of time associated with the occurrence of the external event, the server 34 may receive a message from the alert provider 52 specifying the period of time that is associated with the occurrence of the external event. The alert provider 54 may specify the period of time in a message provided with the alert, or in other examples, specify the period of time in a message in response to a query from server 34. Alternatively, processing unit 42 of server 34 may determine the period of time associated with the occurrence of the external event by predicting the period of time. The prediction may be based, at least in part, on a schedule associated with a type of the external event. For example, server 34 may receive an alert indicating that a football game is occurring (or is about to occur). Based on this alert, server 34 may determine that the external event is a sport, and may query a database or server (possibly alert provider 52) that has information regarding scheduling and/or timing associated with sports. For instance, server 34 may query a server operated by the NFL® that may provide durations of football games and other information, and server 34 may receive the period of time in response to the query. In other examples, server 34 may use the response from the server to predict the period of time.

Once the period of time has been specified, the communication network may cause WCD 20 to search, for the determined period of time, for an available wireless communication system from among the available wireless communication systems in accordance with a second priority order instead of the first priority order. Similar to the first priority order, the second priority order may define a second sequence of the plurality of wireless communication systems, but may be different than the first priority order. The act of searching for an available wireless communication system from among the plurality of wireless communication systems in accordance with a second priority order instead of the first priority order may involve WCD 20 sequentially searching for each of the wireless communication systems in order of the second sequence until the wireless communication device finds an available wireless communication system or until the determined period of time expires.

In practice, causing the WCD 20 to search in the above described manner, may be accomplished by providing WCD 20 with a second PRL that defines the second priority order instead of the first priority order, thereby causing the wireless communication device to search, for the determined period of time, for the available wireless communication system in accordance with the second PRL instead of the first PRL. In other examples, WCD 20 may have different PRLs and a network, such as the communication network depicted in FIG. 1, may cause a directive to be sent that directs WCD 20 to use a certain PRL. Similarly, in a further example, a network may send a directive instructing WCD 20 to change a PRL.

The plurality of wireless communication systems may include a wireless communication system of a first type and a wireless communication system of a second type, wherein the wireless communication system of the first type uses a first air interface protocol, and the wireless communication system of the second type uses a second air interface protocol instead of the first air interface protocol. Further, the wireless communication system of the first type may use a first band-class, and the wireless communication system of the second type may use a second band-class. Still further, the wireless communication system of the first type may be an EV-DO system, and the wireless communication system of the second type may be an LTE system. And yet further, causing the wireless communication device to search, for the determined period of time, for an available wireless communication system from among the plurality of wireless communication systems in accordance with the second priority order instead of the first priority order may comprise giving the wireless communication system of the first type a higher priority than the wireless communication system of the second type.

Figure 5:
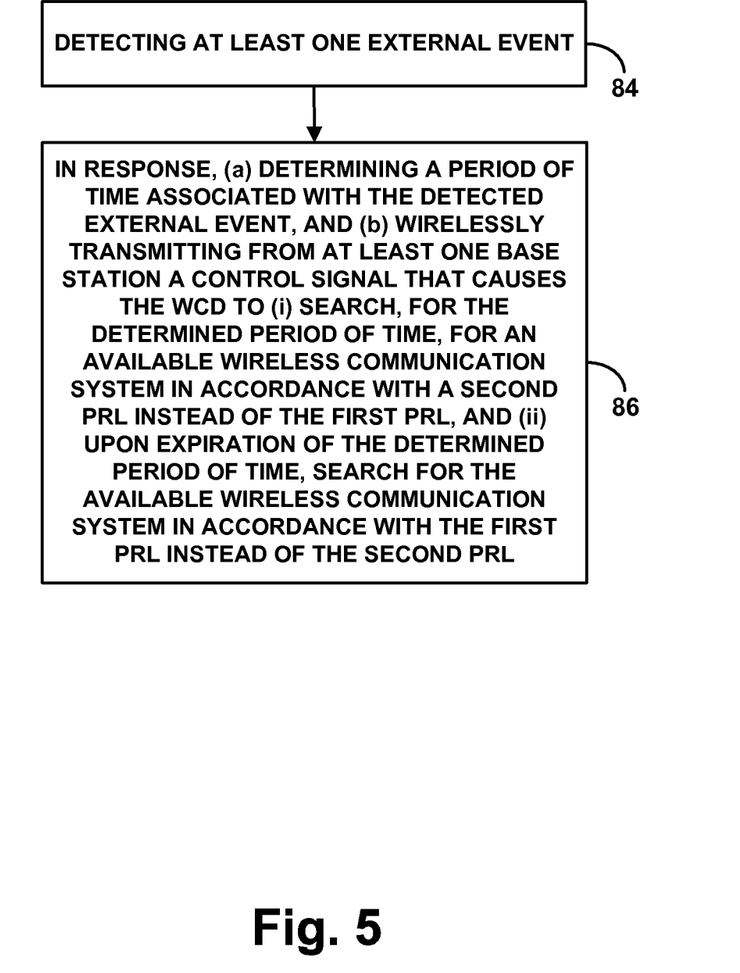
FIG. 5 is another flow chart depicting functions that can be carried out in accordance with the methods.

FIG. 5 is another flow chart depicting functions that can be carried out in accordance with the methods described herein. In this implementation, WCD 20 may be configured to search for an available wireless communication system from among a plurality of wireless communication systems in accordance with a first PRL that that defines a first priority order.

At block 84, the method may involve detecting at a processing unit that an external event has occurred. Processing unit 42 of server 34 may detect the external event in the same or a similar manner as that discussed above with regard to FIG. 4, and processing unit 42 of server 34 may determine the period of time in the same or similar manner as that describe above.

At block 86, in response to detecting that the external event has occurred, the method may then involve (a) based at least in part on the detected external event, determining a period of time that is associated with the detected external event, and (b) wirelessly transmitting from at least one base station a control signal that causes the wireless communication device to (i) search, for the determined period of time, for an available wireless communication system from among the plurality of wireless communication systems in accordance with a second PRL that defines a second priority order instead of the first priority order, and (ii) upon expiration of the determined period of time, search for the available wireless communication system from among the plurality of wireless communication systems in accordance with the first PRL instead of the second PRL.

In an example implementation, the responsive transmitting of the control signal may arise by processing unit 42 of server 34 signaling to controller 22, possibly informing controller 22 which base station(s) should transmit the control signal, and then controller 22 causing the subject base station(s) to transmit the control signal. For instance, the controller may send the signal to the base station(s) with a directive for the base station(s) to wirelessly transmit the signal. Alternatively, the process may take other forms.

In practice, an alert message or other indication of occurrence of the external event may specify a location of the occurrence of the external event, such as a geographic definition of a polygon defining the area at issue. In that case, the method may then further comprise the processing unit or other entity reading the message to determine the specified location, using the mapping data discussed above as a basis to select one or more base stations (of the carrier's multiple base stations for instance) based on their proximity to the determined location, and causing the selected base station(s) to wirelessly transmit the control signal that specifies the period of time.

Exemplary embodiments have been described above. Those skilled in the art will understand, however, that changes and modifications may be made to these embodiments without departing from the true scope and spirit of the invention, which is defined by the claims.

We claim:

1. A method in a communication network for managing a wireless communication device configured to search for an available wireless communication system from among a plurality of wireless communication systems in accordance with a first priority order, the method comprising:

detecting, at a processing unit, at least one external event, wherein the external event does not involve operation of the communication network and does not involve operation of the wireless communication device; and responsive to the detecting, (a) determining, based at least in part on the detected external event, a period of time that is associated with the detected external event, and (b) causing the wireless communication device to (i) search, for the determined period of time, for an available wireless communication system from among the plurality of wireless communication systems in accordance with a second priority order instead of the first priority order, the second priority order being different than the first priority order, and (ii) upon expiration of the determined period of time, search for the available wireless communication system from among the plurality of wireless communication systems in accordance with the first priority order instead of the second priority order, wherein the plurality of wireless communication systems includes a wireless communication system of a first type and a wireless communication system of a second type, wherein the wireless communication system of the first type uses a first air interface protocol, and the wireless communication system of the second type uses a second air interface protocol instead of the first air interface protocol, and wherein causing the wireless communication device to search, for the determined period of time, for an available wireless communication system from among the plurality of wireless communication systems in accordance with the second priority order instead of the first priority order comprises giving the wireless communication system of the first type a higher priority than the wireless communication system of the second type.

2. The method of claim 1, wherein the at least one external event is selected from the group consisting of a severe weather event, a sporting event, a theatrical event, a chemical or nuclear disaster, a natural disaster, and a crowd-gathering event.

3. The method of claim 1,
wherein the first priority order defines a first sequence of the plurality of wireless communication systems, and wherein the second priority order defines a second sequence of the plurality of wireless communication systems, the second sequence being different than the first sequence but including the same wireless communication systems,
wherein, in accordance with the first priority order, the wireless communication device sequentially searches for each of the wireless communication systems in order of the first sequence until the wireless communication device finds an available wireless communication system, and
wherein, in accordance with the second priority order, the wireless communication device sequentially searches for each of the wireless communication systems in order of the second sequence until the wireless communication device finds an available wireless communication system or until the determined period of time expires.

4. The method of claim 1,
wherein the wireless communication system of the first type uses a first band-class, and
wherein the wireless communication system of the second type uses a second band-class instead of the first band-class.

5. The method of claim 4,
wherein the wireless communication system of the first type is a EV-DO system, and
wherein the wireless communication system of the second type is a LTE system.

6. The method of claim 1,
wherein detecting the at least one external event comprises receiving an alert indicating occurrence of the external event, wherein the alert comprises a message specifying the period of time, and
wherein determining the period of time comprises reading the message to determine the period of time.

7. The method of claim 1, wherein detecting the at least one external event comprises:
detecting that there is more than a threshold level of occupancy on an air interface channel that is currently being used by the wireless communication device in a coverage area;
in response to detecting there is more than the threshold level of occupancy, determining a location of the wireless communication device, wherein the location is within the coverage area; and
querying a server to determine, based at least in part on the determined location, that the external event is occurring at the determined location, and
wherein determining the period of time that is associated with the external event comprises receiving from the server a message that specifies the period of time.

8. The method of claim 1,
wherein the wireless communication device includes a data storage containing a first preferred roaming list (PRL) that defines the first priority order, wherein the wireless communication device searches for the available wireless communication system from among the plurality of wireless communication systems in accordance with the first PRL, and
wherein causing the wireless communication device to search, for the period of time, for the available wireless communication system from among the plurality of wireless communication systems in accordance with the second priority order instead of the first priority order comprises:
providing the wireless communication device with a second PRL that defines the second priority order instead of the first priority order, to cause the wireless communication device to search, for the determined period of time, for the available wireless communication system in accordance with the second PRL instead of the first PRL.

9. A method in a communication network for managing a wireless communication device configured to search for an available wireless communication system from among a plurality of wireless communication systems in accordance with a first priority order, the method comprising:
detecting, at a processing unit, at least one external event, wherein the external event does not involve operation of the communication network and does not involve operation of the wireless communication device; and
responsive to the detecting, (a) determining, based at least in part on the detected external event, a period of time that is associated with the detected external event, and (b) causing the wireless communication device to (i) search, for the determined period of time, for an available wireless communication system from among the plurality of wireless communication systems in accordance with a second priority order instead of the first priority order, the second priority order being different than the first priority order, and (ii) upon expiration of the determined period of time, search for the available wireless communication system from among the plurality of wireless communication systems in accordance with the first priority order instead of the second priority order,
wherein detecting the at least one external event comprises receiving an alert indicating occurrence of the external event, wherein the alert comprises a message specifying a type of the external event, and
wherein determining the period of time comprises predicting the period of time based at least in part on the specified type of the external event.

10. The method of claim 9, wherein predicting the period of time comprises predicting the period of time based at least in part on a schedule associated with the specified type of the external event.

11. A method in a communication network for managing a wireless communication device, the wireless communication device including data storage that contains a first preferred roaming list (PRL) that defines a first priority order and being configured to search for an available wireless communication system from among a plurality of wireless communication systems in accordance with the first PRL, the method comprising:
detecting, at a processing unit, at least one external event, wherein the external event does not involve operation of the communication network and does not involve operation of the wireless communication device, wherein detecting the at least one external event comprises receiving an alert indicating occurrence of the external event, wherein the alert comprises a message specifying (i) a location of the occurrence of the external event and (ii) a type of the external event; and responsive to the detecting, (a) determining, based at least in part on the detected external event, a period of time that is associated with the external event, and (b) wirelessly transmitting from at least one base station a control signal that causes the wireless communication device to (i) search, for the determined period of time, for an available wireless communication system from among the plurality of wireless communication systems in accordance with a second PRL that defines a second priority order instead of the first priority order, the second priority order being different than the first priority order, and (ii) upon expiration of the determined period of time, search for the available wireless communication system from among the plurality of wireless communication systems in accordance with the first PRL instead of the second PRL, wherein the method further comprises (a) predicting the period of time based at least in part on the specified type of the external event, (b) reading the message to determine the location, (c) selecting the at least one base station based at least in part on proximity of the at least one base station to the determined location, and (d) causing the selected at least one base station to wirelessly transmit the control signal, wherein the control signal specifies the predicted the period of time.

12. The method of claim 11, wherein the at least one external event is selected from the group consisting of a severe weather event, a sporting event, a theatrical event, a chemical or nuclear disaster, a natural disaster, and a crowd-gathering event.

13. The method of claim 11, wherein predicting the period of time comprises predicting the period of time based at least in part on a schedule associated with the type of the external event.

14. A communication network comprising:

at least one wireless communication device, wherein the at least one wireless communication device is configured to search for an available wireless communication system from among a plurality of wireless communication systems in accordance with a first priority order; and a processing unit, wherein the processing unit is configured to detect at least one external event detect at least one external event by receiving an alert indicating occurrence of the external event, wherein the alert comprises a message specifying (i) a location of the occurrence of the external event, and (ii) a period of time, and wherein the external event does not involve operation of the communication network and does not involve operation of the wireless communication device, and wherein the processing unit is configured to respond to the detecting by (a) determining, based at least in part on the external event, the period of time, wherein the period of time is associated with the external event, and (b) causing at least one base station to wirelessly broadcast a control signal that causes the at least one wireless communication device to (i) search, for the determined period of time, for an available wireless communication system from among the plurality of wireless communication systems in accordance with a second priority order instead of the first priority order, the second priority order being different than the first priority order, and (ii) upon expiration of the determined period of time, search for the available wireless communication system from among the plurality of wireless communication systems in accordance with the first priority order instead of the second priority order, wherein the processing unit is further configured to (a) read the message to determine the location and the period of time, (b) select the at least one base station based at least in part on proximity of the at least one base station to the determined location, and (c) cause the selected at least one base station to wirelessly broadcast the control signal, wherein the control signal specifies the period of time.

* * * * *